C. A. FULLER.
AUTOMOBILE WASHING DEVICE.
APPLICATION FILED AUG. 10, 1915.
1,200,934.
Patented Oct. 10, 1916.
2 SHEETS—SHEET 2.
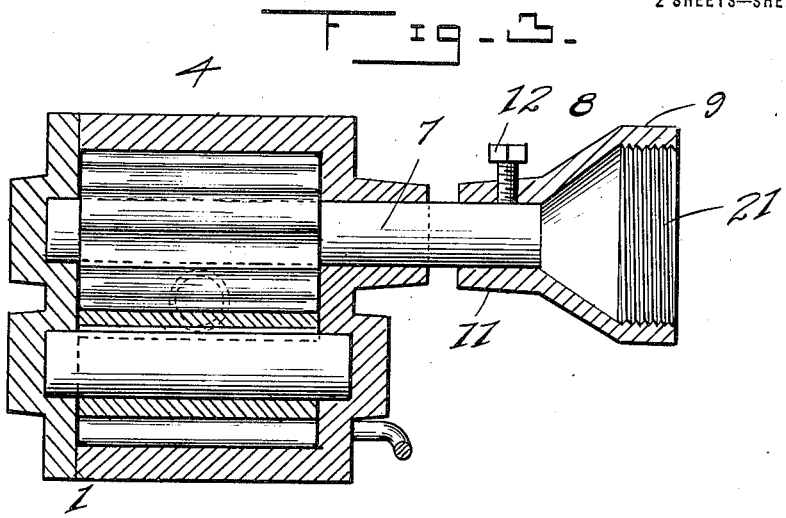
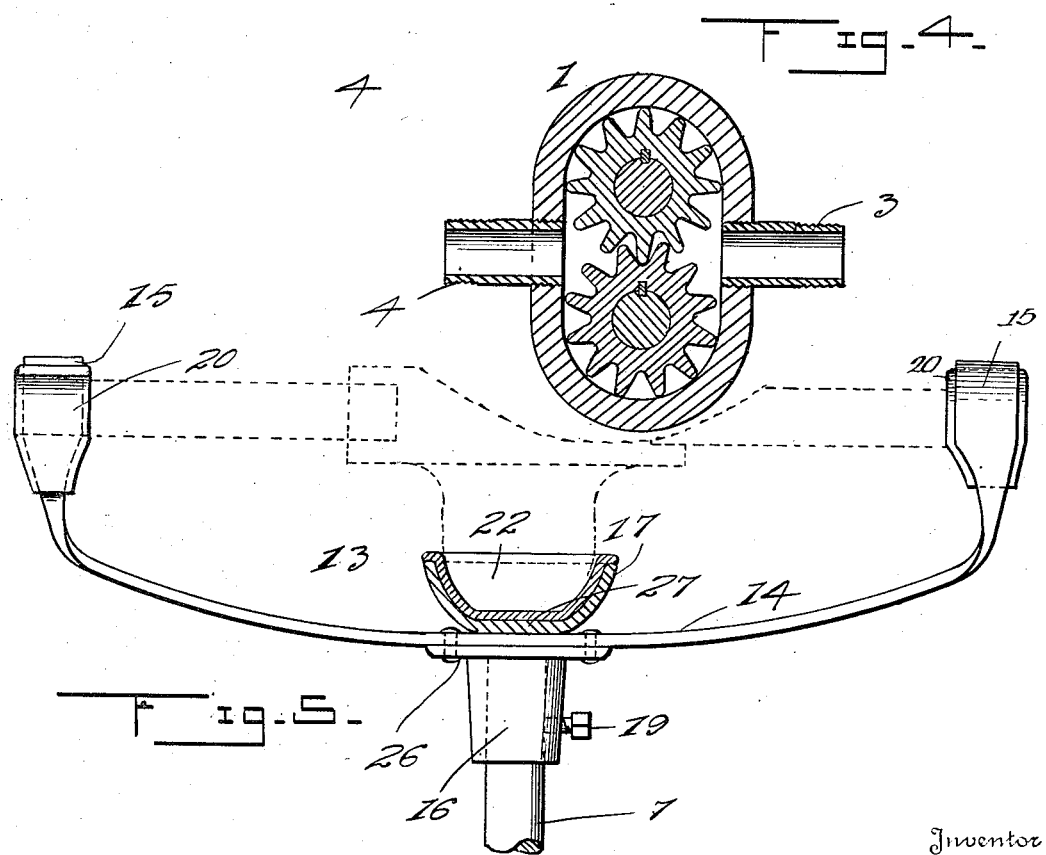

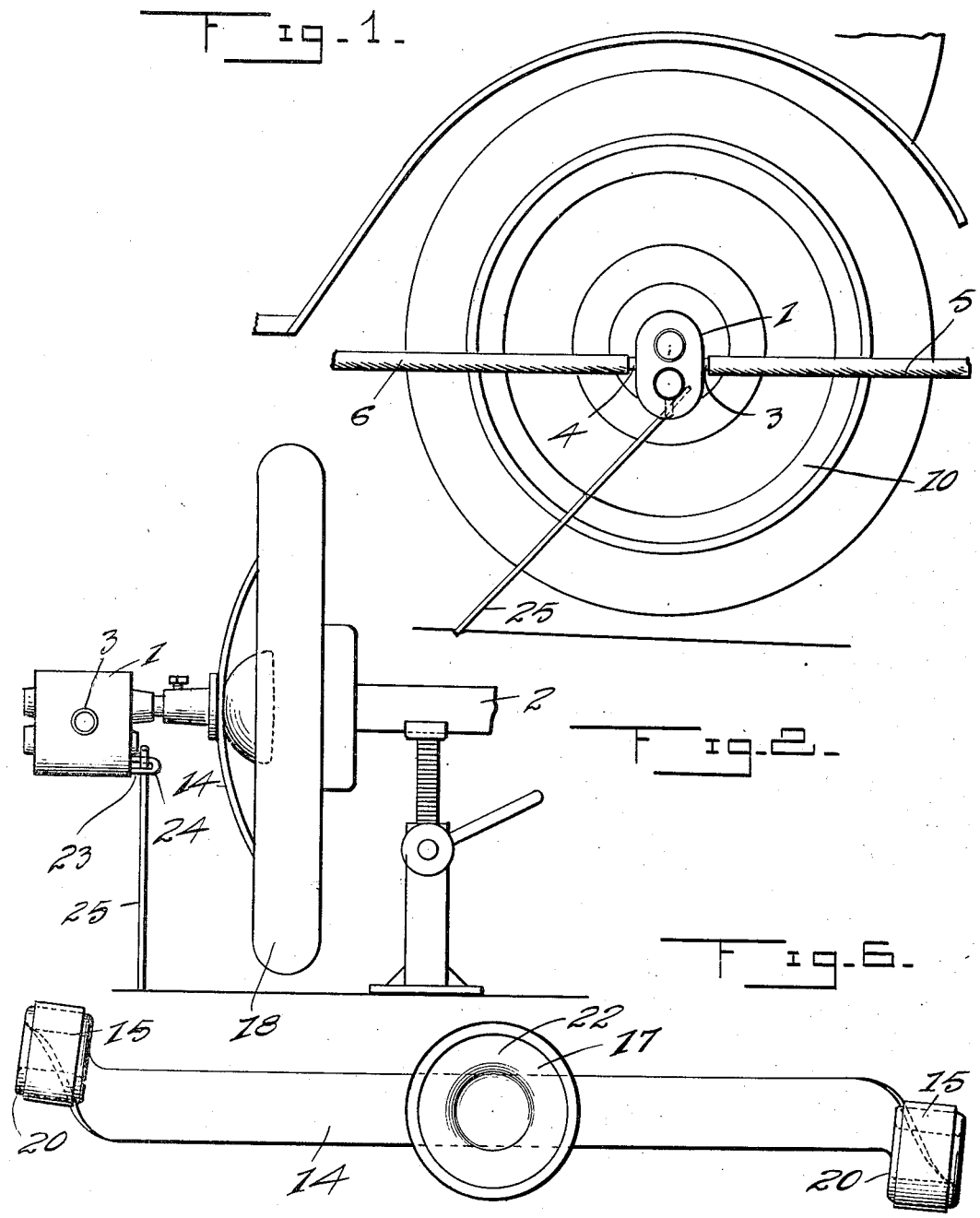

UNITED STATES PATENT OFFICE.

CLARK A. FULLER, OF MENOMONIE, WISCONSIN.

AUTOMOBILE-WASHING DEVICE.

1,200,934.  Specification of Letters Patent. Patented Oct. 10, 1916.

Application filed August 10, 1915. Serial No. 44,756.

*To all whom it may concern:*

Be it known that I, CLARK A. FULLER, a citizen of the United States, residing at Menomonie, in the county of Dunn and State of Wisconsin, have invented certain new and useful Improvements in Automobile-Washing Devices; and I do hereby declare the following to be a full, clear, and exact description of the invention, such as will enable others skilled in the art to which it appertains to make and use the same.

The invention relates to an automobile washing device.

The object of the present invention is to provide a simple, practical and inexpensive device of strong and durable construction designed for washing automobiles and various other motor vehicles at places where there is no water pressure and capable of being easily and quickly connected with one of the driving wheels of such a vehicle so that the motor or engine of the vehicle may be utilized for operating the washing device at the desired speed to secure the requisite discharge of water from the device.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings, Figure 1 is a side elevation of an automobile washing device constructed in accordance with this invention, Fig. 2 is a side elevation showing another means for connecting the shaft of the rotary pump with the driving wheel, Fig. 3 is a transverse sectional view of the automobile washing device arranged as shown in Fig. 1, Fig. 4 is a central vertical sectional view taken substantially on the line 4—4 of Fig. 3, Fig. 5 is an enlarged horizontal sectional view illustrating the construction of the wheel engaging means shown in Fig. 2, Fig. 6 is an elevation of the wheel engaging means of Figs. 2 and 5.

Like numerals of reference designate corresponding parts in the several figures of the drawings.

In the accompanying drawings in which is illustrated the preferred embodiment of the invention, 1 designates a rotary water pump preferably of the rotary gear type as illustrated in Figs. 3 and 4 of the drawings but any other desired type of rotary pump may of course be employed. The rotary pump which is designed to be operated by the driving shaft 2 of an automobile or other motor vehicle as hereinafter described has an intake nipple 3 and a discharge nipple 4 adapted to receive suitable hose pipes 5 and 6 for feeding water to the rotary pump and for refeeding the discharge therefrom. The pipe 5 is designed to extend to a water tank or other suitable receptacle, not shown, and the hose 6 which is designed to be provided with a suitable nozzle may be of any suitable length to enable water to be discharged on all portions of a motor vehicle or automobile.

In applying the device to automobiles and other motor vehicles having polygonal screw caps, the driving shaft 7 of the rotary pump may be connected with such a cap by means of a coupling member 8 having an enlarged outer hollow cylindrical portion 9 forming a socket having interior screw threads 21 and adapted to screw on one end of the driving shaft of an automobile. The coupling member is also provided with an inner cylindrical socket or sleeve 11 fitted on the driving shaft of the pump and provided with a set screw 12 for detachably engaging the said shaft. The set screw enables the coupling member 8 to be readily applied to and removed from the driving shaft of the rotary pump.

When an automobile or motor vehicle is not equipped with a polygonal screw cap at the hubs of its driving wheels the coupling member 8 is removed and a coupling device 13 is employed. The coupling device 13 comprises a resilient bar or member 14 having terminal spoke engaging hooks 15 and carrying an inner socket or coupling sleeve 16 and an outer cap 17. The hooks 15 which are formed integral with the bar or member 14 extend in opposite directions and are adapted to engage with the spokes of a wheel whereby the driving shaft of the pump is connected with the driving wheel and is adapted to be rotated by the same.

The outer socket 17 which is in the form of a cap fits over the hub of the driving wheel 18 and is adapted to center the coupling device on the wheel. The sleeve or coupling 16 which is of cylindrical form has a set screw 19 similar to that described for detachably mounting the coupling device on the driving shaft 7. The hooks 15 and the cap 17 are provided with linings 20 and 22 of leather or any other suitable material to enable the coupling means to be applied to a wheel without marring or otherwise injuring the finish of the same.

The pump casing is provided with a lug 23 having openings 24 adapted to receive a rod or bar 25 which engages the ground or other supporting surface to prevent the pump from rotating with the wheel. Any other suitable anchoring means may of course be employed for this purpose.

In order to operate the washing device the driving axle 2 is jacked up as illustrated in Fig. 2 of the drawings and the device is coupled to one of the driving wheels preferably the left hand wheel. The engine or motor is then started and is operated at the proper speed to secure the desired discharge of water. The socket 16 is provided with a flange or plate 26 which is riveted or otherwise secured to the resilient bar or member 14 and the cap has a flat central portion 27 which is suitably secured to the bar or member 14 at the outer face thereof.

What is claimed is:—

1. A washing device of the class described including a rotary pump having a driving shaft and coupling means for connecting the driving shaft with one of the driving wheels of an automobile or other motor vehicle, said coupling means comprising opposite spoke engaging devices, a cap located between the spoke engaging devices and adapted to fit over the hub of the wheel, and means for securing the cap to one end of the driving shaft of the pump.

2. A washing device of the class described including a rotary pump having a driving shaft and coupling means for connecting the driving shaft with one of the driving wheels of an automobile or other motor vehicle, said coupling means comprising a resilient bar or member having terminal hooks for engaging the spokes of the wheel and a cap mounted on the bar or member at the outer face thereof to fit over the hub of the wheel and a socket extending from the inner side of the bar or member and provided with means for clamping the driving shaft of the pump.

3. A device of the class described including a rotary pump having a driving shaft and coupling means comprising a resilient bar or member having terminal engaging portions for securing the ends of the bar or member to the spokes of a wheel at opposite sides of the hub thereof, a cap carried by the bar or member and arranged to fit over the said hub and means for securing one end of the driving shaft to the said bar or member.

In testimony whereof I affix my signature in presence of two witnesses.

CLARK A. FULLER.

Witnesses:
N. O. VARNUM,
LYNN H. ASHLEY.